Sept. 15, 1942. C. L. BIXBY ET AL 2,295,887
FLUID COUPLING
Filed Dec. 12, 1940
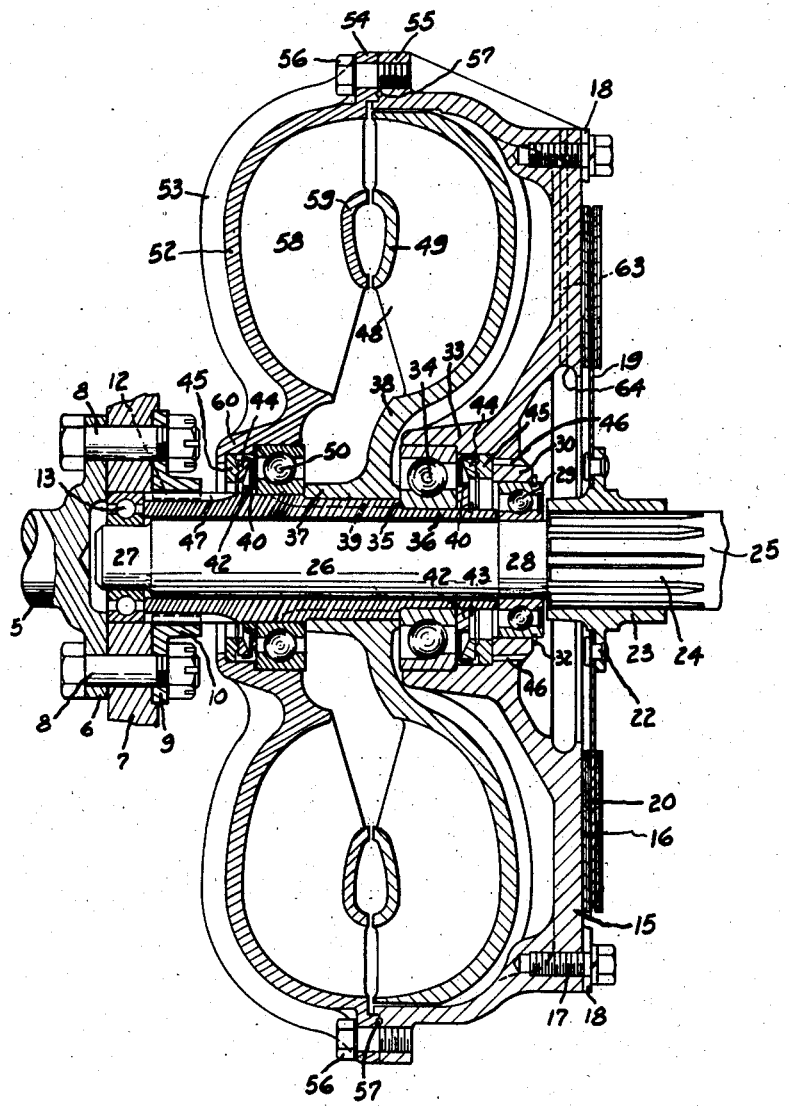
INVENTORS
ROBERT LAPSLEY - CARL L. BIXBY
BY Walter E. Schirmer
ATTORNEY.

Patented Sept. 15, 1942

2,295,887

UNITED STATES PATENT OFFICE 2,295,887

FLUID COUPLING

Carl L. Bixby and Robert Lapsley, Berrien Springs, Mich., assignors to Clark Equipment Company, Buchanan, Mich., a corporation of Michigan Application December 12, 1940, Serial No. 369,708

20 Claims. (Cl. 192—3.2)

This invention relates to fluid couplings, and more particularly is directed to certain features of construction and arrangement of the coupling parts to provide a coupling which may be easily assembled and which may be utilized in connection with standard types of vehicle transmissions to facilitate the transmitting of drive from the engine to the transmission gearing.

One of the primary objects of the present invention is the provision of a construction in which the housing of the coupling, forming the driven part of the coupling, is arranged to provide a clutching surface whereby a friction clutch may be directly engageable therewith to facilitate shifting of the gears in the transmission.

Another important object of the present invention is to provide a coupling in which the component parts may be readily assembled as a bench assembly, and may then be assembled onto the clutch shaft or drive shaft of the transmission, and the transmission and clutch assembly may then be assembled onto the motor and all of the parts will then be arranged in concentric alinement.

Still another feature of the present invention is the provision of a structure in which no additional transverse partition in the bell and transmission housing need be provided in order to provide a bearing support for the drive shaft, as this shaft is supported in concentric relation by the pilot bearing in the crankshaft and the front main transmission bearing, and the fluid coupling in turn is thereby centrally alined with respect to the axis of the engine.

Still another feature of the present invention is the provision of a construction which may be readily assembled in successive steps to provide a complete coupling unit which may be handled as a unit in the assembly of the same between the engine and transmission.

Numerous other objects and advantages of the present invention, such as the simplicity of design of assembly and novel arrangement of the parts, will be more apparent from the following description which, taken in conjunction with the accompanying drawing will disclose to those skilled in the art the particular construction and operation of a preferred form of the present invention.

The single figure of the drawing comprises a sectional view through a coupling and associated clutch mechanism embodying the principles of the present invention.

Referring now in detail to the drawing, an engine crankshaft is indicated generally at 5 and is provided at its end with a flange portion 6 to which is secured the flywheel 7 of the engine by means of bolts 8. The bolts 8 also secure the internally splined member 9 to the flywheel 7, the member 9 being piloted into the rear face of the flywheel 7 and having a hub portion 10 formed with the internal splines 12.

Disposed against a shoulder formed by the flange 6 and the bore of the flywheel 7 is a ball bearing assembly 13, the outer race of this assembly being disposed against the shoulder and the bearing preferably being of the packed type.

Considering now in detail the fluid coupling, this coupling comprises a housing member 15 which has the rear face thereof formed to provide the radial clutch surface 16. Mounted to the periphery of the housing 15 by means of the studs 17 is the flange portion 18 of a usual clutch assembly (not shown), including the clutch housing and the springs which normally urge the clutch plate 19 against the surface 16. The clutch plate 19 is provided with a friction surface 20 of a desired type, and the plate is secured by the rivets 22 to a hub 23 mounted in splined engagement on the splines 24 of the drive shaft 25.

The shaft 25 extends into a change speed transmission (not shown), and has formed at the end thereof a drive gear of the required type, and also may have piloted in the end thereof the stud end of a transmission main shaft. Any usual type of transmission either with or without synchronizing mechanism can be driven from the shaft 25, and it is of course understood that the clutch hub 23 is so arranged as to receive suitable clutch actuating mechanism of conventional type.

Preferably, the clutch mechanism and fluid coupling are enclosed within the bell end portion of a transmission housing, this housing having a transverse partition piloting the rear end of the shaft 25 and having means for sealing the bell housing relative to the transmission portion of the housing.

The shaft 25 forwardly of the splines is provided with a reduced portion 26 terminating at its forward end in the stud portion 27 which is journalled within the bearing assembly 13. The shaft is also provided with a shoulder portion 28 upon which is mounted the inner race of a ball bearing assembly 29, which also is of the sealed type.

The housing 15 is provided with an inwardly directed annular hub 30 which is suitably mounted upon the outer race of the bearing assembly 29, there being a snap ring 32 provided for locking the outer race of the bearing assembly and the portion 30 against relative movement in one direction.

The housing 15 is also provided with an axially extending cylindrical portion 33 which is suitably counterbored to provide a bearing seat for the ball bearing assembly 34. The inner race of this assembly is mounted against the splined shoulders 35 of a tubular sleeve member 36 encircling the portion 26 of the shaft 25. This maintains the sleeve and the housing 15 against relative axial movement, and also retains the hub portion 37 of the impeller 38 in fixed engagement on the splines 39 of the sleeve 36. Disposed between the bearings 29 and 34 is a lubricant seal which comprises a spring disc 40 mounted upon the retaining ring 42 pressed against the inner race of the bearing assembly and held in position by the snap ring 43. The disc 40 carries at its outer end the seal member 44 which is suitably brazed thereto and which, by being mounted on the spring member 40, is normally urged into positive bearing contact with the seal ring 45 carried between the portion 33 and the portion 30 of the housing 15. This holds the seal members 44 and 45 in pressure engagement to prevent any flow of lubricant therebetween. The members 44 and 45 may be of any suitable alloy material suitable for this purpose, such as "Nitrolloy" or a similar bearing seal metal. The portion 30 of the housing 15 is also provided with the knockout openings 46 for disassembling the structure if desired. The forward end of the sleeve 36 is provided with the splines 47 which engage with the splines 12 carried by the flywheel 7, whereby the sleeve 36 is directly coupled to the flywheel for direct rotation therewith whenever the engine is operated, and the end of the tubular sleeve member 36 abuts the outer race of bearing 13 to prevent axial movement in one direction.

The impeller 38, which is mounted upon the sleeve 36 and is driven thereby, is provided with the vane portion 48 and substantially closes the annular concave portion of the housing 15. This vane portion 48 is also provided with the annular ring portion 49 of conventional type, it being understood that the impeller can be of any desired shape and construction insofar as the vanes and fluid coupling action are concerned.

Mounted upon the sleeve 36 intermediate the splines 39 and 47 is a ball bearing assembly 50 which forms a support for the rotor portion 52 of the coupling. This rotor portion 52 of the coupling is provided with radially extending ribs 53 for cooling purposes, and is also provided at its periphery with a flange portion 54 which is piloted in and secured to the flange portion 55 of the housing 15 by means of the studs 56.

In order to form a seal to prevent the escape of lubricant between the flanges 54 and 55, each of these flanges is provided with a shallow groove within which is disposed a soft metal wire, such as a copper or lead wire 57, so that when the two flanges 54 and 55 are brought into pressure engagement by means of the studs 56, the wire will be mashed within the two shallow grooves and will flow into a perfect sealing engagement therewith, thereby positively preventing any flow of the fluid outwardly between the meeting faces of the two housings.

The rotor portion 52 of the coupling is provided with the vanes 58 and with an annular ring portion 59 cooperating with the ring 49 to form a toroidal middle ring between the vanes 48 and 58 whereby the fluid in the coupling will circulate around the ring under centrifugal pressure to provide the coupling action. The hub portion of the rotor 52 is provided with an extension 60 forming a shoulder for the bearing assembly 50, and also enclosing a sealing assembly corresponding to that found between the bearings 29 and 34 and identified by corresponding reference numerals. This provides an effective seal preventing the fluid from passing outwardly through the bearing 50.

The housing 15 is provided with two or more radially extending passageways 63 terminating at their inner ends in an annular inwardly facing channel 64 formed in the housing. This provides an oil retainer and discharge so that any oil thrown off from the bearing 29 or leaking through the seal 44—45 will be discharged outwardly through the ports 63 and will not pass into the friction clutch portion of the assembly.

In the operation of the coupling assembly, it will be apparent that rotation of the crankshaft 5 will drive the flywheel 7, and consequently will rotate the sleeve 36. Rotation of this sleeve in turn effects corresponding rotation of the impeller 38 and, with the fluid coupling filled with oil, centrifugal pressure will drive this oil radially outwardly around the ring 49 and then across in to the rotor portion of the housing whereby the rotor portion 52 and the housing 15 will tend to pick up speed and rotate with the impeller 36. By the provision of the friction clutch 19, which is capable of bearing against the rear face 16 of the housing 15, this rotation of the rotor can be transmitted to the shaft 25 driving the same and consequently transmitting torque to the transmission. It will be apparent that when the clutch 19 is shifted axially out of engagement with the face 16 of the housing, the shaft 25 is disconnected entirely from the fluid coupling, and consequently no torque is transmitted thereto regardless of the speed of the engine crankshaft. As a result, shifting of the gears in the transmission can be facilitated by disengagement of the clutch, and the arrangement can be designed so that the friction clutch engages after the gears are shifted so that the transmission of torque to the transmission gearing will be through the fluid coupling, and consequently a smooth picking up of the drive in the various speed ratios will be effected.

The seal assemblies 44—45 insure little or no leakage of fluid outwardly from the fluid coupling, while the seal 57 positively prevents any leakage of fluid outwardly at the point of greatest centrifugal force.

In assembling the structure thus far described, the housing 15 has seal member 45 and bearing 29 pressed into place, and is then placed in a suitable fixture and the friction clutch plate 19 and driving assembly 18 are assembled in their proper alinement.

All parts required to be assembled to the tubular shaft 36 are then assembled onto it and this assembly is then placed into the housing 15.

The seal member 45 is then pressed into the housing 52 and this assembly is then located in position on housing 15 with the seal wire 57 laid in the grooves provided and the studs 56 drawn up.

This completes the assembly of the fluid coupling and friction clutch mechanism, and this entire mechanism then comprises a unitary assembly. This is of distinct advantage in allowing the assembly of the fluid coupling and friction clutch elements as a unit prior to the assembly of this mechanism between the transmission and the engine crankshaft.

This complete assembly can then be slipped onto the clutch shaft 25, and the composite transmission and clutch assembly installed on the motor in the usual manner, registering splines 47 into teeth 12 and pilot 27 into bearing 13.

We are aware that changes may be made in details of the fluid coupling structure and other component parts illustrated in the invention without in any way departing from the underlying principles thereof. We therefore do not intend to be limited to the exact details of the construction herein shown and described, but only insofar as defined by the scope and spirit of the appended claims.

We claim:

1. In combination, a fluid coupling comprising a housing, an impeller within said housing, a tubular sleeve extending axially therethrough, spaced bearing means for rotatably supporting said housing on said sleeve, said sleeve having a splined intermediate portion receiving said impeller, said housing having a radial surface, a shaft extending through and rotatable relative to said sleeve, and friction clutch means on said shaft engageable with said surface for coupling said housing and shaft together.

2. In combination, an engine crankshaft, an internally splined hub driven thereby, a sleeve having a splined end engageable in said hub, an impeller keyed to said sleeve, a rotor housing rotatably journalled on said sleeve and enclosing said impeller, a shaft extending through said sleeve and piloted at one end in said crankshaft, and friction clutch means on said shaft engageable with said housing for coupling said shaft and housing together for conjoint rotation.

3. The combination of claim 2 further characterized by the provision of bearing means between said housing and shaft beyond the opposite end of said sleeve centering said housing relative to said shaft.

4. In combination, a sleeve member having a fluid impeller keyed thereon, a housing enclosing said impeller and rotatably mounted on said sleeve, a shaft rotatably journalled coaxially of said housing and extending through said sleeve, and friction clutch means on said shaft engageable with a radial wall of said housing for coupling said housing and shaft together.

5. In combination, a sleeve member having a splined portion intermediate its ends, a fluid impeller keyed on said portion, a housing enclosing said impeller and including a rotor driven from said impeller, bearings on said sleeve on opposite sides of said splined portion rotatably journalling said housing thereon, and cooperating fluid sealing means carried by said housing and sleeve on the outer side of each of said bearings.

6. The combination of claim 5 further characterized in that said housing comprises two portions having adjacent peripheral flanges bolted together, and an extrudable metallic ring adapted to be deformed by said bolting to seal the flanges against leakage therepast.

7. The combination of claim 5 further characterized in the provision of a shaft extending through said sleeve, and a bearing between said housing and shaft holding them in coaxial alinement.

8. A fluid coupling comprising a sleeve member having an intermediate externally splined portion, a fluid impeller having a splined hub mounted on said sleeve portion, annular bearing seats on each end of said splined portion, bearings thereon, and a two piece housing enclosing said impeller and including a rotor portion driven from said impeller, said housing being journalled on said bearings.

9. The coupling of claim 8 further characterized by means engaging one end of said sleeve for driving said sleeve.

10. The coupling of claim 8 further characterized by the provision of mating grooves in adjacent faces of each piece of said two piece housing, and a soft metal wire disposed in said grooves and deformable upon securing said faces together to form a seal therebetween.

11. The coupling of claim 8 further characterized in that one wall of said housing is provided with a planar radial face adapted to be engaged by a friction clutch disc.

12. In combination, a tubular sleeve, a ball bearing assembly adjacent one end thereof, an annular housing member of semi-cylindrical form mounted on said bearing and opening toward the opposite end of said sleeve, splines on said sleeve, a fluid impeller mounted on said splines, a second bearing assembly on said sleeve adjacent the other end of said sleeve, and a second annular housing member mounted on said last-named bearing of semi-cylindrical form joined at its periphery to said first housing member and forming therein a rotor adapted to be driven by said impeller.

13. The combination of claim 12 further characterized by the provision of sealing means between the housing members and said sleeve for preventing oil leakage outwardly beyond said bearings.

14. The combination of claim 12 further characterized by the provision of means at one end of the sleeve for driving the same.

15. The combination of claim 12 wherein said first housing member has a planar radial surface, a shaft extending through said sleeve, and friction clutch means on said shaft engageable with said surface.

16. In combination, a driving shaft, a separable clutch shaft rotatably piloted by and alined therewith, a tubular impeller shaft concentric with and disposed about said clutch shaft and separately piloted by and constantly driven by said driving shaft, a fluid impeller splined on said impeller shaft, bearings on said impeller shaft on opposite sides of said impeller, a fluid rotor and a fluid housing member concentrically supported on said bearings, said member having a radial friction face, a bearing carried by said clutch shaft to coaxially aline said housing member and clutch shaft, fluid seals between said impeller shaft and said rotor and housing member, and a friction clutch splined on said clutch shaft and engageable with said radial face.

17. In combination, a driving shaft, a driven shaft journalled at one end in the driving shaft, a tubular sleeve encircling said driven shaft and driven from said driving shaft, bearings on opposite ends of said sleeve, a rotor and associated housing journalled on said bearings, an impeller within said housing splined to said sleeve, a radial clutch surface on said housing, and friction clutch means splined on said driven shaft engageable with said surface.

18. In combination, a fluid impeller, a tubular shaft having splined connection with said impeller for driving the same, axially spaced bearings on said shaft on opposite sides of said impeller, a rotor and housing carried on said bearings, a second shaft extending axially through said tubular shaft and having a bearing thereon engaged by said housing, said housing having a radial clutch surface, and friction clutch means on said second shaft engageable with said surface.

19. The combination of claim 18 further characterized in the provision of oil seals between said rotor and housing and said tubular shaft on the outer side of each of said axially spaced bearings.

20. In combination, a driving shaft having a recessed end, a driven shaft journalled in said end, an internally toothed member on said end of said driving shaft about said driven shaft, a tubular sleeve coaxial with said driven shaft having a splined end drivingly engaged in said member, axially spaced bearings on said sleeve, an intermediate splined portion on said sleeve, a fluid impeller thereon, a rotor and housing for said impeller journalled on said bearings, said rotor, housing, impeller and sleeve being assembled as a unit and adapted to be positioned in driving engagement with said driving shaft, a radial surface on said housing, and a clutch plate on said driven shaft engageable with said surface.

CARL L. BIXBY.
ROBERT LAPSLEY.